July 9, 1968
F. McBAIN ETAL
3,391,523
ROTARY STRAW DECK AND SIEVELESS CHAFFER
Filed March 8, 1965
2 Sheets-Sheet 2
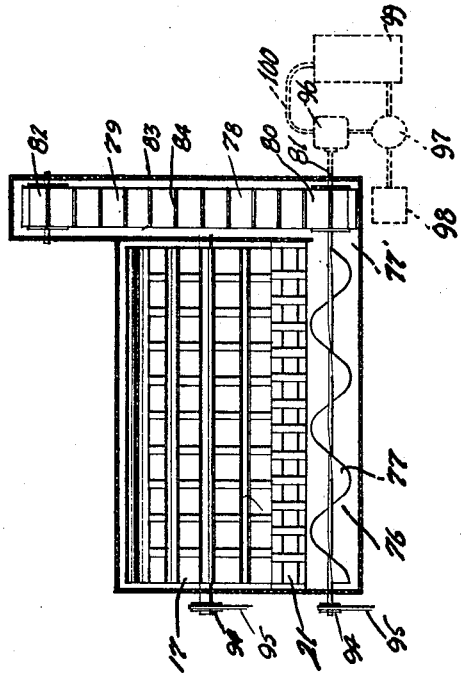
Fig. 4
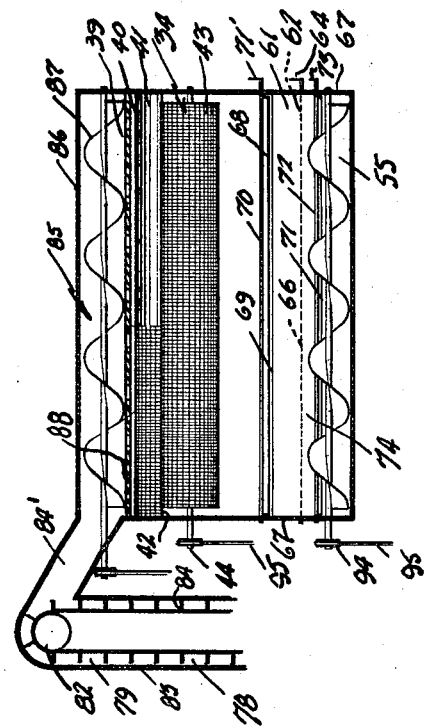
Fig. 5
Fig. 3
INVENTORS:
FRANK McBAIN
FREDERICK STREICH
WILLIAM STREICH
THEIR ATT'YS

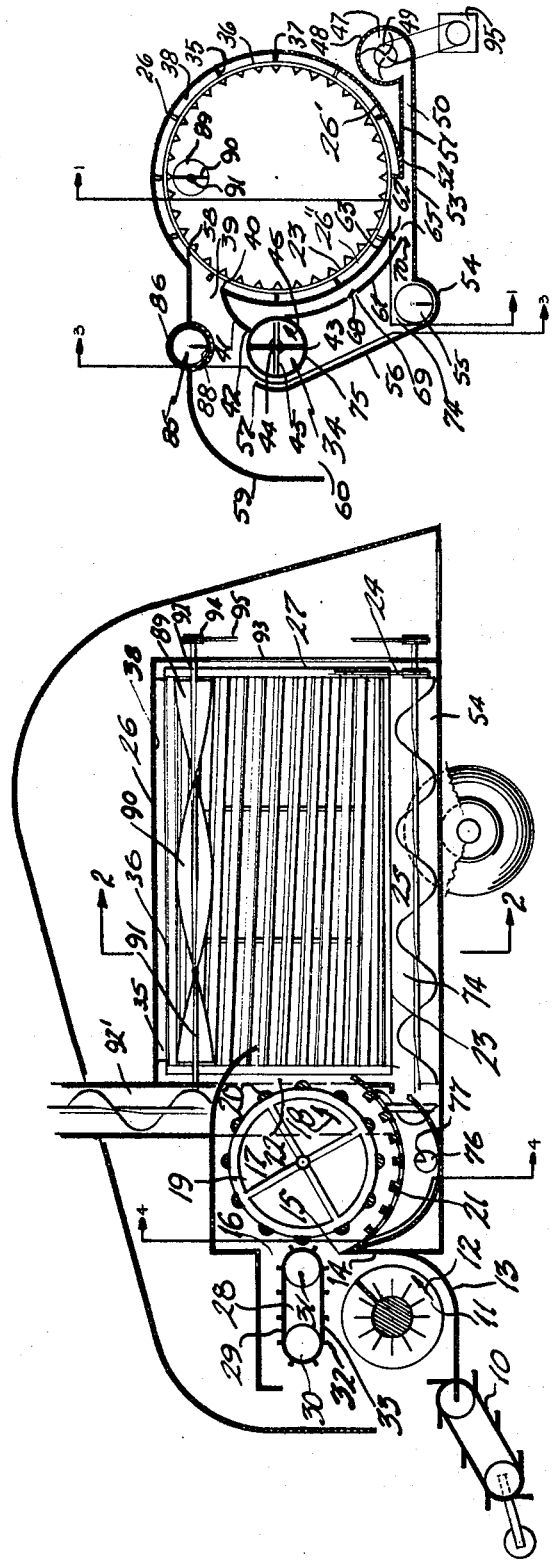

3,391,523
ROTARY STRAW DECK AND
SIEVELESS CHAFFER

Frank McBain, 605–8300 Jasper Ave., Edmonton, Alberta, Canada, and Frederick Streich and William Streich, both care of General Delivery, Clandeboye, Manitoba, Canada
Filed Mar. 8, 1965, Ser. No. 437,754
28 Claims. (Cl. 56—19)

ABSTRACT OF THE DISCLOSURE

This invention is a rotary straw deck and sieveless chaffer including a horizontal tedder above a conventional transverse conveyor having a vertical shroud therebehind. Also included is a rotary chaffing assembly which acts upon all of the material passing down through the rotary threshing assembly to separate the grain from chaff and weed seeds. The transference of the material passing through the rotary straw deck is facilitated by stationary wiper blades engaging the upper surface of the straw deck.

---

Our invention relates to new and useful improvements in rotary straw decks and sieveless chaffers, and particularly in improvements to the device described and claimed in U.S. Patent No. 2,825,455 dated Mar. 4, 1958.

In the above mentioned patent, we disclosed a device which picked up swathed grain, conveyed it to a concave threshing assembly, whereupon the threshed straw and seed was deposited within a rotating straw deck.

The grain, straw and chaff were tumbled by the rotation of the straw deck so that the grain fell between the interstices formed within the straw deck, the straw being discharged rearwardly through the open rear end of the straw deck.

The present invention includes improvements to this basic structure, said improvements including means to prevent stones and other foreign material from entering the concave threshing assembly. We accomplish this by providing a substantially vertical rear shroud behind the swath auger and a substantially horiztional tedding conveyor situated above the swath auger which teds the swath into the rotary concave threshing assembly, any stones and the like falling by gravity downwardly and being prevented from entering the concave threshing assembly.

We have also found that weed seeds, small kernels, and chaff are deposited through the rotary straw deck together with the grain or seeds that are required so that consequently we have provided means to convey all of this material to a rotating chaffing assembly whereupon it is acted upon by a controlled air blast thus permitting the desired seeds or grain to fall downwardly to a collecting auger, the chaff, weed seeds, and small grain kernels being blown outwardly, and away from the desired seed fraction. We also include a plurality of blades secured to the rotary straw deck, said straw deck being enclosed within a circumferential shroud, said blades wiping against the shroud and moving the material passing through the straw deck, to the rotary chaffer.

The principal object and essence of the invention is therefore to provide a device of the character herewithin described which prevents stones from entering the rotary concave threshing assembly, and at the same time provides a rotary chaffing cylinder which separates the desired grain from undesired fractions.

A further object of the invention is to provide a device of the character herewithin described which can be used with a solid concave or a preforated concave. The perforated concave is of value when threshing peas, corn and the like under which circumstances these relatively large kernels pass through the perforated concave, are picked up by an auger and elevated to be deposited upon the rotary chaffing cylinder.

Another object of the invention is to provide a device of the character herewithin described in which the various components all rotate, there being no reciprocating parts in the device. This has the advantage of eliminating vibration, reducing wear, and enabling all of the components to be well supported within bearings to provide a device which is extremely reliable in operation.

Another object of the invention is to provide a device of the character herewithin described in which includes a tedding conveyor which teds the swath as it enters the concave threshing cylinder thus preventing overloading of the threshing cylinder which sometimes occurs when a heavy swath is encountered.

Still another object of the invention is to provide a device of the character herewithin described in which the various components can either be operated by pulleys and belts from a source of power or, alternatively, can be operated independently from hydraulic motors.

Yet another object of the invention is to provide a device of the character herewithin described which is simple in construction, economical in manufacture, and otherwise well suited to the purpose for which it is designed.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIGURE 1 is a side sectional elevation of my device taken along line 1—1 fo FIGURE 2.

FIGURE 2 is a vertical section of my device taken along line 2—2 of FIGURE 1.

FIGURE 3 is a section substantially along the line 3—3 of FIGURE 2.

FIGURE 4 is a section substantially along the line 4—4 of FIGURE 1.

In the drawings like characters of reference indicate corresponding parts in the different figures.

Proceeding therefore to describe my invention in detail, reference should first be made to FIGURE 1 in which 10 illustrates a pickup conveyor adapted to pick up swaths from the ground and feed same to a transversely situated swath auger assembly 11 rotating in direction of arrow 12 and being partially surrounded by means of shroud 13.

The rear wall 14 of this shroud is substantially vertical and terminates at 15 thus defining the lower horizontal edge of the entry 16 to a rotary concave threshing assembly 17, rotating in direction of arrow 18.

The concave threshing assembly 17 is conventional in design inasmuch as it includes a rotor 19 having a plurality of flashing bars 20 secured around the circumference, said flashing bars cooperating with a stationary concave plate 21 situated in spaced relationship from the cylinder 19 in the conventional manner.

The threshed swath passing through the threshing assembly 17, is deposited within the open front end 22 of a rotary s'raw deck 23 mounted upon wheels 24, for rotation as clearly shown and described in the above mentioned U.S. Patent No. 2,825,455.

Grain chaff and small particles pass through the straw deck to the area 25 defined by a circumferentially located shroud 26 situated in spaced and parallel relationship around the straw deck 23.

Straw is deposited rearwardly through the open rear end 27 of the straw deck as described in the above mentioned patent.

In order to prevent overloading of the concave threshing assembly 17, I have provided what is commonly known as a rattle chain conveyor assembly 28 situated substantially horizontally and above the aforementioned swath auger 11.

The rattle chain conveyor comprises a pair of spaced and parallel chains 29 engaging around sprockets 30 and 31 and having tedder bars 32 spanning the chains in spaced and parallel relationship so that the lower run 33 moves in the direction towards the concave threshing assembly 17. As the bars 32 pass around the sprockets 31, they are in spaced and parallel relationship with the upper horizontal edge 15 of the vertical shroud 14 and ted the swath into the concave threshing assembly 17 thus preventing overloading of the threshing assembly if a relatively heavy stand is being threshed.

Conventional combines or threshing machines normally move the threshed grain onto reciprocating chaffers which separate the chaff, weed seeds and the like from the grain fraction desired. They also separate the straw and deposit same rearwardly from the machine.

However such reciprocating chaffers are difficult to adjust for varying loads so that either desired grain is deposited rearwardly with the straw or, alternatively, a certain amount of chaff and fine weed seeds is delivered with the desired grain fraction.

We have found it desirable to provide a rotary chaffing assembly collectively designated 34 and to transfer the grain, chaff, weed seeds and the like from the area 25 below the straw deck, to this rotary chaffer.

The aforementioned circumferentially located shroud 26 encloses the circumference of the rotary straw deck and all material passing through the interstices of the straw deck are deposited upon the lower portion 26' of this shroud.

We provide a plurality of longitudinally extending flexible wiper blades 35, secured to and extending radially from the outer surface 36 of the rotary straw deck. The outer edges or extremities 37 of these blades engage the inner surface 38 of the shroud thus moving any material such as grain, weed seeds, chaff and the like collecting within the area 25, upwardly on the surface of the shroud 26' to a discharge slot 39 situated substantially in a horizontal location with reference to the rotary straw deck and clearly shown in FIGURE 2.

Secured to the edge 40 of the shroud defining the lower boundary of the discharge 39, is a downwardly inclined seed discharge plate 41 which may be either solid or perforate as desired and the lower edge 42 of this plate is situated just above the aforementioned rotary chaffing cylinder assembly 34.

This rotary chaffing assembly comprises a screen cylinder 43 mounted upon an axle 44 by means of spiders 45 at each end thereof, said screen cylinder rotating in the direction of arrow 46.

A source of air taking the form of a blower assembly 47 is situated along one side of the rotary straw deck adjacent the base thereof and on the opposite side to the rotary chaffer 34. This blower comprises a casing 48 having a fan assembly 49 rotatable therein thus forcing air under pressure into an air discharge duct 50 extending the full length of the straw deck 23.

The upper panel 51 of the duct is secured to the lower portion of the shroud 26 as at 52 and the lower panel 53 extends under the straw deck, continues to form an enclosure 54 for a grain pickup auger 55, and then inclines upwardly and outwardly as at 56 to partially surround the aforementioned chaffing cylinder 43 in spaced and parallel relationship thereto, terminating at 57 in spaced and parallel relationship to the aforementioned lower edge 42 of the grain discharge plate 41.

The aforementioned shroud 26 extends to a point 58 spaced from the edge 40 thus defining the aforementioned discharge 39. It then extends outwardly and downwardly as shown at 59 thus defining, with the panel portion 56, a chaff discharge area 60.

An intermediate air dividing baffle 61 is situated in spaced relationship to the panel 56 and the portion 26" of the shroud 26.

An air deflecting means taking the form of a flap 62 is pivoted to the shroud portion 26' adjacent the lower end 63 of the baffle 61 and is controlled by means of operating lever 64 so that the gap 65 between the dividing baffle 61 and the shroud portion 26", may be controlled.

This flap 62 is hinged as shown in phantom at 66, between the pair of spaced and parallel supporting members 67.

A first air deflecting means in the form of a flap 68 controls an elongated opening 69 formed in the dividing baffle 61 intermediate the upper and lower sides thereof, said flap 68 being hinged as at 70 and controlled by control lever 71' as clearly shown in FIGURE 3.

A second air deflecting means in the form of a flap 71 is hingedly secured to the lower side 63 of the intermediate divider 61, said flap also being hinged as at 72 and being controlled by lever 73. The first flap 68 is adapted to open inwardly towards the shroud portion 26" thus controlling the direction of air passing upwardly towards the rotating screen chaffer 34.

The second flap 71 is hinged to pivot on the underside of the dividing baffle 61 and controls the amount of air passing from the conduit 50 to the wind tunnel portion 74 defined by the intermediate or dividing baffle 61 and the portion 56 of the lower plate 53.

The flap 62 in conjunction with the flap 68 controls the amount of air passing between the intermediate or dividing baffle 61 and the shroud portion 26".

Air passing upwardly through this portion 74' of the wind tunnel escapes between the lower edge 42 of the seed guiding plate 41 and the circumference 75 of the rotating screen chaffer 34 and keeps the upper surface of the screen clear of straw as this portion of the air lifts the straw and deposits same within the discharge 60.

The remaining portion of the air passing through the wind tunnel portion 74, is controlled by flap 71 and also by flap 68, some of the wind passing through the rotating screen 34 and some passing upwardly between the circumference of the screen and the curved upper portion of the panel 56. This removes chaff and light weed seeds from the surface of the chaffing cylinder and deposits same within the discharge 60.

The desired grain fraction is carried over by the screen 34 and falls downwardly along panel 56 to a main collecting auger 55 enclosed within the portion 54 of the panel 53 as hereinbefore described. From there the grain may be augered to a convenient disposal point in the usual manner.

When the assembly is designed to be used in threshing peas, corn and the like, it is desirable to have the concave 21 perforated.

This permits some of the relatively heavy peas and corn kernels to pass through the perforations of the concave and eliminates the necessity of the majority of the kernels to be processed by the rotating straw deck and also prevents damage to the kernels due to overthreshing by the cylinder.

Situated below the concave plates 21 is a collecting trough 76 the base of which is a rotating auger 77.

This auger picks up the kernels or the like collected by the trough 76 and moves them to one end 77' thereof as shown in FIGURE 4.

The kernels or the like are discharged from this end 77' into a vertically situated elevator 78 which comprises a belt 79 rotating around a lower pulley 80 secured to the shaft 81 of auger 76. The belt also extends around an upper pulley 82 situated substantially vertically above pulley 80, and the belt and pulleys are enclosed within a casing 83.

Flaps 84 extend outwardly from the surface of the belt 78 in spaced positions thereearound and the outer ends of these flaps engage the casing 83 thus permitting the flaps to elevate the kernels and the like deposited therein from the auger 76.

As the belt passes over the upper pulley 82, the kernels or the like are deposited into a downwardly inclined delivery chute 84' and fed into a horizontally disposed distributing auger assembly collectively designated 85.

This distributing auger assembly is situated vertically above the aforementioned rotating chaffing cylinder 34 and comprises a cylindrical casing 86 having an auger flight assembly 87 rotatable therein.

A plurality of apertures 88 are formed in the base of this cylindrical casing 86 so that the kernels or the like travelling along the rotating auger assembly 87 are deposited relatively evenly upon the upper surface of the rotating chaffing cylinder 34 together with any chaff, weed seeds or the like which may be included therewith.

The chaff and weed seeds are removed by the air blast as hereinbefore described and the kernels of corn, peas and the like are deposited within the collecting auger 55 A conventional vertical bin auger 92' extends upwardly from the end of auger 55.

However, this portion of the chaffing assembly is only utilized if the concave plate 21 is perforated and is designed specifically for use when threshing such crops as peas, corn and the like in order to prevent same being damaged due to overthreshing by the cylinder.

It is desirable to maintain the interior surface of the rotary straw deck clear of straw and in this connection we have provided a spiral type brush assembly 89 situated within the straw deck and parallel thereto adjacent the upper side thereof.

This is formed by winding a strip of resilient material 90 upon a shaft 91 which is mounted within bearings 92 within the supporting framework 93.

It is designed to rotate in a direction opposite to the direction of rotation of the drum and to engage he inner surface thus maintaining same clear of straw and thus preventing clogging from occurring.

The various rotating portions of the device are provided with drive pulleys 94 around which engage drive belts 95 and these are connected to a source of power shown schematically in FIGURE 2 by reference character 95.

However, as the method of connecting the various belts to this source of power are well known, it is not deemed necessary to show further details thereof.

We prefer to utilize an hydraulic motor 96 shown in phantom in FIGURE 4, attached to each shaft requiring drive characteristics, said hydraulic motor being operated by means of a common pump 97 which in turn is operated by a source of power 98 also shown in phantom in FIGURE 4.

Reference character 99 shows a reservoir and 100 the conduits extending between the pump, the hydraulic motor and the reservoir.

By utilizing hydraulic motors for driving the various components, full control is maintained over the speed of individual components thus giving greater flexibility to the device and permitting the operator to adjust the various components to suit the conditions under which the device is being operated.

Also the control levers 64, 71 and 73 controlling the position of the flaps 62, 68 and 71 may be extended adjacent the operator's position by conventional linkage but here again, as the operation of such linkage is well known, it has not been deemed necessary to show further details thereof.

Since various modifications can be made to the invention herein described within the scope of the invention concept disclosed it is not intended that protection of the said invention should be interpreted as restricted to the modification or modifications or known parts of such concept as have been particularly described, defined, or exemplified, since this disclosure is intended to explain the construction and operation of such concept, and not for the purpose of limiting protection to any specific embodiment or details thereof.

What we claim as our invention is:

1. In a rotary combine including supporting framework, a source of power, a swath pickup conveyor, a swath auger behind said conveyor, a rotary threshing assembly behind said swath auger, and a rotary straw deck behind said rotary threshing assembly; means to transfer the swath from said swath auger to said threshing assembly, said means comprising a horizontal conveyor situated above said swath auger and extending from above said swath auger to the intake of said rotary threshing assembly, a rear wall shroud behind said swath auger extending vertically from adjacent the base of said swath auger to a position substantially in horizontal alignment with the top of said auger adjacent the intake of said rotary threshing assembly, to resist stones and the like from being transferred to said rotary threshing assembly, the lower run of said horizontal conveyor cooperating with the upper edge of said shroud to ted said swath as same enters said rotary threshing assembly, and a rotary chaffing assembly situated longitudinally of said rotary straw deck and to one side thereof, said rotary chaffing assembly comprising a screen cylinder, means to convey seed passing through said straw deck onto said rotary chaffing assembly, an outer shroud and an inner shroud partially enclosing said rotary chaffing assembly and defining a wind tunnel, a source of air connected to said wind tunnel, and a seed collecting auger at the base of said wind tunnel.

2. The device according to claim 1 which includes an intermediate air dividing baffle in said wind tunnel, and adjustable first and second air deflecting means on said baffle for controlling the direction and volume of air passing through said tunnel.

3. The device according to claim 2 which includes a seed discharge plate partially overlying said rotary chaffing assembly upon which seed from said straw deck is deposited and fed to said rotary chaffing assembly.

4. The device according to claim 3 in which said seed discharge plate is perforate.

5. The device according to claim 4 in which said rotary threshing assembly includes a perforated concave plate, auger means below said concave plate to convey seed passing through said plate, a distributing auger situated in spaced and parallel relationship above said rotary chaffing assembly, and elevator means connected to the discharge end of said auger means and to the intake end of said distributing auger.

6. The device according to claim 5 in which said distributing auger includes an auger casing and an auger flight rotatable therein, said casing being provided with a plurality of apertures along the underside thereof to distribute seeds along the length of said rotary chaffing assembly.

7. The device according to claim 1 which includes a seed discharge plate partially overlying said rotary chaffing assembly upon which seed from said straw deck is deposited and fed to said rotary chaffing assembly.

8. The device according to claim 7 in which said seed discharge plate is perforate.

9. The device according to claim 8 in which said rotary threshing assembly includes a perforated concave plate, auger means below said concave plate to convey seed passing through said plate, a distributing auger situated in spaced and parallel relationship above said rotary chaffing assembly, and elevator means connected to the discharge end of said auger means and to the intake end of said distributing auger.

10. The device according to claim 9 in which said distributing auger includes an auger casing and an auger flight rotatable therein, said casing being provided with a plurality of apertures along the underside thereof to distribute seeds along the length of said rotary chaffing assembly.

11. The device according to claim 1 in which said rotary threshing assembly includes a perforated concave plate, auger means below said concave plate to convey seed passing through said plate, a distributing auger situated in spaced and parallel relationship above said rotary chaffing assembly, and elevator means connected to the discharge end of said auger means and to the intake end of said distributing auger.

12. The device according to claim 11 in which said distributing auger includes an auger casing and an auger flight rotatable therein, said casing being provided with a plurality of apertures along the underside thereof to distribute seeds along the length of said rotary chaffing assembly.

13. The device according to claim 1 which includes further means to convey seed passing through said rotary straw deck, to said rotary chaffing assembly, said means including a circumferential shroud enclosing said rotary straw deck in spaced and parallel relationship thereto, and a plurality of longitudinally extending, flexible wiper blades secured to and extending radially from the outer surface of said straw deck, the extremities of said blades engaging said circumferential shroud, and a seed discharge formed in said circumferential shroud adjacent said rotary chaffing assembly.

14. The device according to claim 2 in which said rotary threshing assembly includes a perforated concave plate, auger means below said concave plate to convey seed passing through said plate, a distributing auger situated in spaced and parallel relationship above said rotary chaffing assembly, and elevator means connected to the discharge end of said auger means and to the intake end of said distributing auger.

15. The device according to claim 14 in which said distributing auger includes an auger casing and an auger flight rotatable therein, said casing being provided with a plurality of apertures along the underside thereof to distribute seeds along the length of said rotary chaffing assembly.

16. The device according to claim 2 which includes further means to convey seed passing through said rotary straw deck, to said rotary chaffing assembly, said means including a circumferential shroud enclosing said rotary straw deck in spaced and parallel relationship thereto, and a plurality of longitudinally extending, flexible wiper blades secured to and extending radially from the outer surface of said straw deck, the extremities of said blades engaging said circumferential shroud, and a seed discharge formed in said circumferential shroud adjacent said rotary chaffing assembly.

17. The device according to claim 7 in which said rotary threshing assembly includes a perforated concave plate, auger means below said concave plate to convey seed passing through said plate, a distributing auger situated in spaced and parallel relationship above said rotary chaffing assembly, and elevator means connected to the discharge end of said auger means and to the intake end of said distributing auger.

18. The device according to claim 17 in which said distributing auger includes an auger casing and an auger flight rotatable therein, said casing being provided with a plurality of apertures along the underside thereof to distribute seeds along the length of said rotary chaffing assembly.

19. The device according to claim 7 which includes further means to convey seed passing through said rotary straw deck, to said rotary chaffing assembly, said means including a circumferential shroud enclosing said rotary straw deck in spaced and parallel relationship thereto, and a plurality of longitudinally extending, flexible wiper blades secured to and extending radially from the outer surface of said straw deck, the extremities of said blades engaging said circumferential shroud, and a seed discharge formed in said circumferential shroud adjacent said rotary chaffing assembly, to distribute seed onto said seed discharge plate.

20. The device according to claim 3 in which said rotary threshing assembly includes a perforated concave plate, auger means below said concave plate to convey seed passing through said plate, a distributing auger situated in spaced and parallel relationship above said rotary chaffing assembly, and elevator means connected to the discharge end of said auger means and to the intake end of said distributing auger.

21. The device according to claim 20 in which said distributing auger includes an auger casing and an auger flight rotatable therein, said casing being provided with a plurality of apertures along the underside thereof to distribute seeds along the length of said rotary chaffing assembly.

22. The device according to claim 3 which includes further means to convey seed passing through said rotary straw deck, to said rotary chaffing assembly, said means including a circumferential shroud enclosing said rotary straw deck in spaced and parallel relationship thereto, and a plurality of longitudinally extending, flexible wiper blades secured to and extending radially from the outer surface of said straw deck, the extremities of said blades engaging said circumferential shroud, and a seed discharge formed in said circumferential shroud adjacent said rotary chaffing assembly, to distribute seed onto said seed discharge plate.

23. The device according to claim 8 which includes further means to convey seed passing through said rotary straw deck, to said rotary chaffing assembly, said means including a circumferential shroud enclosing said rotary straw deck in spaced and parallel relationship thereto, and a plurality of longitudinally extending, flexible wiper blades secured to and extending radially from the outer surface of said straw deck, the extremities of said blades engaging said circumferential shroud, and a seed discharge formed in said circumferential shroud adjacent said rotary chaffing assembly, to distribute seed onto said seed discharge plate.

24. The device according to claim 11 which includes further means to convey seed passing through said rotary straw deck, to said rotary chaffing assembly, said means including a circumferential shroud enclosing said rotary straw deck in spaced and parallel relationship thereto, and a plurality of longitudinally extending, flexible wiper blades secured to and extending radially from the outer surface of said straw deck, the extermities of said blades engaging said circumferential shroud, and a seed discharge formed in said circumferential shroud adjacent said rotary chaffing assembly.

25. The device according to claim 14 which includes further means to convey seed passing through said rotary straw deck, to said rotary chaffing assembly, said means including a circumferential shroud enclosing said rotary straw deck in spaced and parallel relationship thereto, and a plurality of longitudinally extending, flexible wiper blades secured to and extending radially from the outer surface of said straw deck, the extremities of said blades engaging said circumferential shroud, and a seed discharge formed in said circumferential shroud adjacent said rotary chaffing assembly.

26. The device according to claim 17 which includes further means to convey seed passing through said rotary straw deck, to said rotary chaffing assembly, said means including a circumferential shroud enclosing said rotary straw deck in spaced and parallel relationship thereto, and a plurality of longitudinally extending, flexible wiper blades secured to and extending radially from the outer surface of said straw deck, the extremities of said blades engaging said circumferential shroud, and a seed discharge formed in said circumferential shroud adjacent said rotary chaffing assembly, to distribute seed onto said seed discharge plate.

27. The device according to claim 9 which includes further means to convey seed passing through said rotary straw deck, to said rotary chaffing assembly, said means including a circumferential shroud enclosing said rotary straw deck in spaced and parallel relationship thereto, and a plurality of longitudinally extending, flexible wiper blades secured to and extending radially from the outer surface of said straw deck, the extremities of said blades engaging said circumferential shroud, and a seed discharge formed in said circumferential shroud adjacent said rotary chaffing assembly, to distribute seed onto said seed discharge plate.

28. The device according to claim 5 which includes further means to convey seed passing through said rotary straw deck, to said rotary chaffing assembly, said means including a circumferential shroud enclosing said rotary straw deck in spaced and parallel relationship thereto, and a plurality of longitudinally extending, flexible wiper blades secured to and extending radially from the outer surface of said straw deck, the extremities of said blades engaging said circumferential shroud, and a seed discharge formed in said circumferential shroud adjacent said rotary chaffing assembly.

References Cited

UNITED STATES PATENTS

| | | |
|---|---|---|
| 1,386,298 | 8/1921 | Winslow. |
| 2,397,375 | 3/1946 | Scranton _____ 56—21 |
| 2,463,061 | 3/1949 | Small _____ 56—364 |
| 2,467,501 | 4/1949 | Schoenrock _____ 56—20 X |
| 2,825,455 | 3/1958 | Streich et al. ____ 130—27.15 X |
| 2,875,768 | 3/1959 | Belkowski _____ 130—27.6 |

ABRAHAM G. STONE, *Primary Examiner.*

P. A. RAZZANO, *Assistant Examiner.*